United States Patent
Shimodaira

(10) Patent No.: US 8,036,463 B2
(45) Date of Patent: Oct. 11, 2011

(54) CHARACTER EXTRACTING APPARATUS, METHOD, AND PROGRAM

(75) Inventor: Masato Shimodaira, Tokyo (JP)

(73) Assignee: Keyence Corporation, Osaka (JP)

( * ) Notice: Subject to any disclaimer, the term of this patent is extended or adjusted under 35 U.S.C. 154(b) by 996 days.

(21) Appl. No.: 11/898,628

(22) Filed: Sep. 13, 2007

(65) Prior Publication Data

US 2008/0063273 A1 Mar. 13, 2008

(30) Foreign Application Priority Data

Sep. 13, 2006 (JP) ................................ 2006-248367
Sep. 3, 2007 (JP) ................................ 2007-228222

(51) Int. Cl.
*G06K 9/34* (2006.01)
(52) U.S. Cl. .................... 382/176; 382/171; 382/177
(58) Field of Classification Search ........... 382/168–189
See application file for complete search history.

(56) References Cited

U.S. PATENT DOCUMENTS

| | | | | |
|---|---|---|---|---|
| 4,377,803 A * | 3/1983 | Lotspiech et al. | ............. | 382/171 |
| 5,018,216 A * | 5/1991 | Kojima | ........................ | 382/170 |
| 5,046,114 A * | 9/1991 | Zobel | ............................ | 382/171 |
| 5,381,488 A * | 1/1995 | Suda et al. | .................... | 382/174 |
| 5,557,689 A * | 9/1996 | Huttenlocher et al. | ....... | 382/177 |
| 5,640,466 A * | 6/1997 | Huttenlocher et al. | ....... | 382/177 |
| 5,684,891 A * | 11/1997 | Tanaka et al. | ................. | 382/178 |
| 5,692,069 A * | 11/1997 | Hanson | ........................ | 382/171 |
| 5,790,696 A * | 8/1998 | Takahashi | ..................... | 382/177 |
| 5,825,919 A * | 10/1998 | Bloomberg et al. | .......... | 382/177 |
| 5,825,920 A * | 10/1998 | Kitamura et al. | ............. | 382/178 |
| 5,926,564 A * | 7/1999 | Kimura | ........................ | 382/170 |
| 5,956,433 A * | 9/1999 | Sasaki | .......................... | 382/275 |
| 6,081,616 A * | 6/2000 | Vaezi et al. | ................... | 382/171 |
| 6,188,790 B1 * | 2/2001 | Yoshikawa et al. | ........... | 382/194 |
| 6,249,604 B1 * | 6/2001 | Huttenlocher et al. | ....... | 382/174 |
| 6,327,384 B1 * | 12/2001 | Hirao et al. | ................... | 382/173 |
| 6,535,619 B1 * | 3/2003 | Suwa et al. | .................... | 382/101 |
| 7,471,826 B1 * | 12/2008 | Navon et al. | .................. | 382/171 |
| 7,734,065 B2 * | 6/2010 | Anisimovich et al. | ........ | 382/111 |
| 2007/0263930 A1 * | 11/2007 | Ito | ................................. | 382/177 |
| 2008/0063271 A1 * | 3/2008 | Shimodaira | ................... | 382/171 |
| 2008/0063272 A1 * | 3/2008 | Shimodaira | ................... | 382/171 |
| 2008/0063273 A1 * | 3/2008 | Shimodaira | ................... | 382/171 |
| 2008/0181500 A1 * | 7/2008 | Ito et al. | ........................ | 382/177 |

FOREIGN PATENT DOCUMENTS

| | | |
|---|---|---|
| JP | 2872768 B | 1/1999 |
| JP | 2001-211348 A | 8/2001 |

\* cited by examiner

*Primary Examiner* — Aaron Carter
(74) *Attorney, Agent, or Firm* — Smith Patent Office

(57) ABSTRACT

The present invention provides a technique of accurately extracting areas of characters included in a captured image. A character extracting device of the present invention extracts each character in an image with compensated pixel values. In more detail, the character extracting device integrates pixel values at each coordinate position in the image along a character extracting direction. Then, the character extracting device predicts the background area in the image based on the integrated pixel value. The compensated pixel values are compensated based on integrated pixel values at the predicted background area from integrated pixel values at each coordinate position.

19 Claims, 9 Drawing Sheets

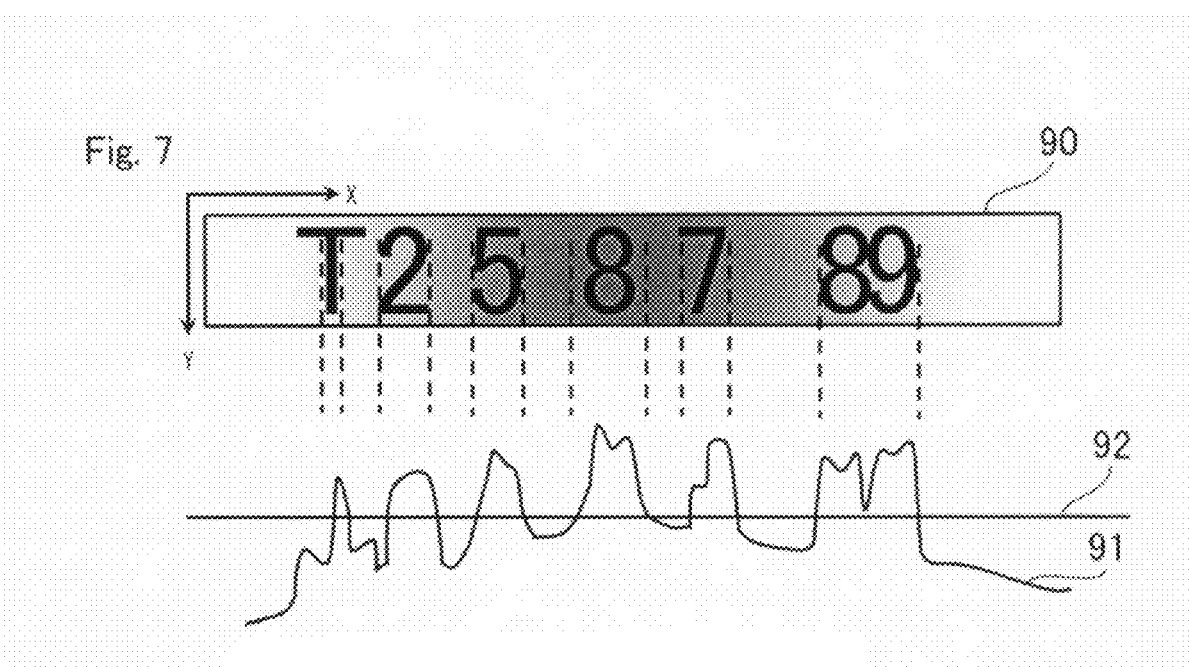

CHARACTER EXTRACTING APPARATUS, METHOD, AND PROGRAM

BACKGROUND OF THE INVENTION

1. Field of the Invention

The present invention relates to a technique for extracting a character area from a captured image.

2. Description of the Related Art

By capturing an image of characters printed on a commodity or product with an image acquisition device, for example, a two dimensional image acquisition device using a CCD, CMOS or the like, and performing a character recognizing process in an image processing apparatus, a process of recognizing the print can be automated.

To perform the character recognizing process with high precision, a character extracting process as a pre-process of the character recognizing process is important in the image processing apparatus.

The character extracting process is a process of determining a character area included in a captured image. In a case where a captured image includes a character string made of a plurality of characters, each of the character areas corresponding to each character in the character string has to be determined from the character string.

One of the methods of extracting a character string is a method utilizing projection data of an image. Specifically, waveform data obtained by integrating pixel values of a captured image in an extraction direction is generated and analyzed. A fact is utilized that a pixel integration value of a character part is larger than that in a background part (in a case where a character is black, it is sufficient to make the pixel integration value of the character part large by reversal), and an area in which the pixel integration value exceeds a predetermined threshold is recognized as a character area.

In general, at an image captured by an image acquisition device, a light amount, especially at the peripheral portion of the image, is relatively lower than the other portion of the image based on lens characteristics of the image acquisition device. Accordingly, it is possible that the peripheral portion has a lower light amount compared with the central portion of the image. Further, by effect of the lower light amount at the peripheral portion, it is possible that the image has the inconsistencies in the intensity of the image.

FIG. 7 is a diagram showing an image 90 of a medium on which characters "T258789" are printed and waveform data 91 generated from the image 90. The waveform data 91 is data obtained by integrating pixel values along a character extracting direction Y at a coordinate position in a character string direction X of the image 90. For easier explanation, the waveform data 91 and the image 90 including the characters "T258789" are shown so as to be aligned in the character string direction X. It is understood from the figure that the pixel integration values of the character portions are larger than pixel integration values of the background part.

Since a character is black in this case, it is sufficient to make the pixel integration value of the character part large by reversal. Then, FIG. 7 shows a case that the captured image 90 has a center portion darker than the other remaining portion by an effect of illumination. Therefore, the pixel integration values of both end portions are relatively lower than the other portions in the waveform data 91.

For example, in case where a threshold 92 is set at a level as shown in the figure and then a character area is determined whether the area is in excess of the threshold 92 or not; it is not possible to extract the characters from the image precisely. In more detail, since a central portion (a longitudinal portion) of a character "T" shown in FIG. 7 has larger integrated pixel values, the portion is recognized as a character area. However, since a lateral portion of the character "T" has smaller integrated pixel value as compared with the longitudinal portion's one and, at the lateral portion, the light amount provided from an illumination device (not shown) is lower than the other areas' one, the corresponding portion of the waveform data 91 for the lateral portion becomes below the threshold 92 and thus it is difficult to recognize the lateral portion as a character area.

To solve such a problem, in general, a shading correction is provided. In detail, it is carried out so that the intensity difference between the central portion of the image and the other portions of the image are compensated. However, such a shading compensation process requires a longer processing time, so total processing time for extracting character areas takes longer.

Further, as another problem, when a distance between the characters is narrow, it is difficult to recognize the character areas. In the case shown in FIG. 7, a character "8" and character "9" are close to each other so as to be partially overlapping. In this case, integrated pixel values become larger at a boundary area between the character "8" and the character "9". Therefore, when the threshold 92 is set at a position shown in the figure, the waveform data 91 (integrated pixel values) of the boundary area are above the threshold 92. As the result, it is recognized that the character "8" and the character "9" are combined as one character area.

To solve such a problem, especially to separate two characters from each other, Japanese Patent Publication No. 2,872,768 discloses a method of setting a search start point and a search end point in an image, integrating pixel values of the pixels passing a path connecting the start and end points, and finding a path in which the integration value is the minimum. The method allows the image processing device to extract each character area accurately even if the characters are closer to each other, however, the method has a problem that a process to choose the path takes a long time. Moreover, the method requires the following items to be preset: the search start point, the search end point, start point and the path connection between them. That is, the method requires knowing a boundary area of the characters roughly in advance.

SUMMARY OF THE INVENTION

In view of the above problem in the conventional technologies, an object of the present invention is to provide a technique of accurately extracting areas of characters included in a captured image where increasing of the volume of the process tasks is restrained.

In order to achieve this and other objects, according to a first aspect of the present invention, there is provided an apparatus for extracting each of a plurality of characters from a character string having the plurality of characters arranged in a first direction and included in an image. The apparatus comprises an integrating device integrating a plurality of pixel values along a second direction orthogonal to the first direction at each of a plurality of coordinate positions along the first direction over the image; a setting device setting a section having a predetermined width at each of a plurality of different positions along the first direction over the image; a first extracting device extracting a first point where a pixel value integrated by the integrating device is the minimum value in each of the sections set by the setting device; a second extracting device extracting a second point where a pixel value integrated by the integrating device is the minimum value in each group of the first points, extracted by the first extracting device, in sequence along the first direction; an interpolating device calculating a base value at each of the plurality of coordinate positions along the first direction over the image from an interpolation based on the pixel values integrated by the integrating device at the second points extracted by the second extracting device; a compensating device subtracting the base value from the pixel value integrated by the integrating device as a compensated value at each of the plurality of coordinate positions along the first direction over the image; and a recognition device recognizing an area having the compensated value compensated by the compensating device in excess of a predetermined threshold value as a character area.

In order to achieve the above and other objects, according to a second aspect of the present invention, there is provided an apparatus for extracting each of a plurality of characters from a character string having the plurality of characters arranged in a first direction and included in an image. The apparatus comprises an integrating device integrating a plurality of pixel values along a second direction orthogonal to the first direction at each of a plurality of coordinate positions along the first direction over the image; a first extracting device extracting a first point where a pixel value integrated by the integrating device is a local minimum value from the plurality of coordinate positions along the first direction over the image; a setting device setting a section having a predetermined width corresponding to each first point extracted by the first extracting device; a second extracting device extracting the first point as a second point where a pixel value integrated by the integrating device is a minimum value in each of the sections corresponding to the first point; an interpolating device calculating a base value at each of the plurality of coordinate positions along the first direction over the image from an interpolation based on the pixel values integrated by the integrating device at the second points extracted by the second extracting device; a compensating device compensating the pixel value integrated by the integrating device as a compensated value at each coordinate position along the first direction over the image based on the base value; and a recognition device recognizing an area having the compensated value compensated by the compensating device in excess of a predetermined threshold value as a character area.

In order to achieve the above and other objects, according to a third aspect of the present invention, there is provided a method for extracting each of a plurality of characters from a character string having the plurality of characters arranged in a first direction and included in an image. The method comprises the steps of: integrating a plurality of pixel values along a second direction orthogonal to the first direction at each of a plurality of coordinate positions along the first direction over the image; setting a section having a predetermined width at each of a plurality of different positions along the first direction over the image; extracting a first point where a pixel value integrated by the integrating step is a minimum value in each of the sections set by the setting step; extracting a second point where a pixel value integrated by the integrating step is a minimum value in each group of the first points, extracted by the first extracting step, in sequence along the first direction; calculating a base value at each of the plurality of coordinate positions along the first direction over the image from an interpolation based on the pixel values integrated by the integrating step at the second points extracted by the second extracting step; subtracting the base value from the pixel value integrated by the integrating step as a compensated value at each coordinate position along the first direction over the image; and recognizing an area having the compensated value compensated by the compensating step in excess of a predetermined threshold value as a character area.

As the above-mentioned, a character extracting device of the present invention extracts each character in an image with compensated pixel values. In more detail, the character extracting device integrates pixel values at each coordinate position in the image along a character extracting direction. Then, the character extracting device predicts background area in the image based on the integrated pixel value. The compensated pixel values are compensated based on integrated pixel values at the predicted background area from integrated pixel values at each coordinate position.

The present invention allows a character extracting device to extract each character in an image accurately even in a case where uneven brightness occurred in the image due to the influence of a lens feature of a capture device or an illumination, and the like.

The present invention also allows a character extracting device to extract each character in an image accurately even in a case where the characters are closer to each other.

BRIEF DESCRIPTION OF THE DRAWINGS

FIG. 7 is a diagram showing an example of characters and waveform data;

DETAILED DESCRIPTION OF THE PREFERRED EMBODIMENTS

Outline of the System

Figure 1:
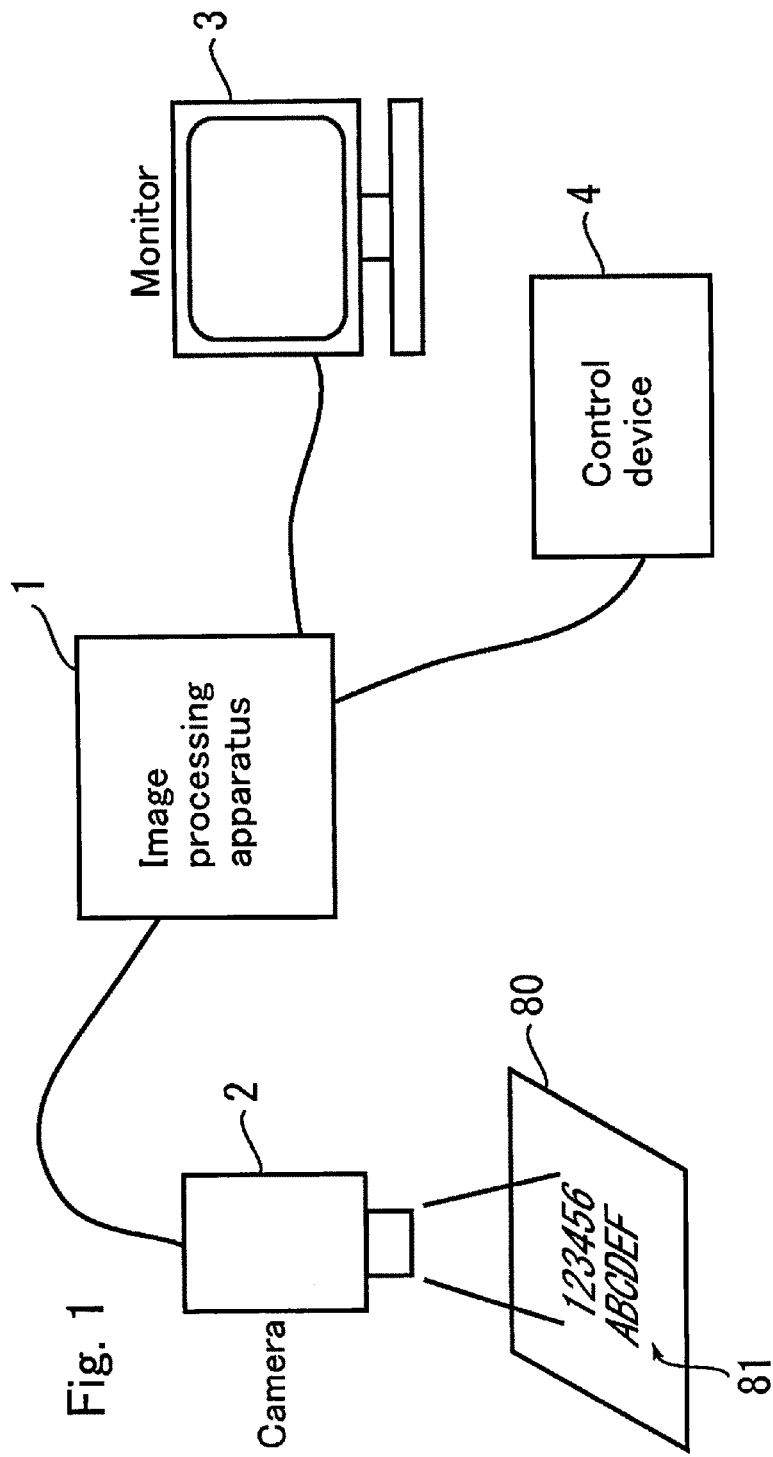
FIG. 1 is a general view of an image processing system according to an embodiment of the invention.

An embodiment of the present invention will be described below with reference to the drawings. FIG. 1 is a general view of an image processing system of an embodiment. The image processing system has an image processing apparatus 1, a camera 2, and a monitor 3. The camera 2 has an imaging sensor such as a CCD or CMOS and an optical unit. As the monitor 3, for example, a liquid crystal display is used. The image processing apparatus 1 is connected to a control device 4 controlled by a process of the image processing system.

In the image-processing system, an image of characters 81 printed on a medium 80 is captured by the camera 2, and the image processing apparatus 1 analyzes the image captured by the camera 2. An analysis result and process data are properly displayed on the monitor 3. When characters are finally recognized from the captured image in the image processing apparatus 1, the control device 4 is controlled in accordance with the recognition result.

The medium 80 on which the characters 81 are printed may be, for example, a medium adhered on a product or a package itself of an article. The image processing apparatus 1 recognizes the characters 81 printed on the product or article, thereby performing a task of checking a product/article manufacturing process, a conveying process, or the like.

Figure 2:
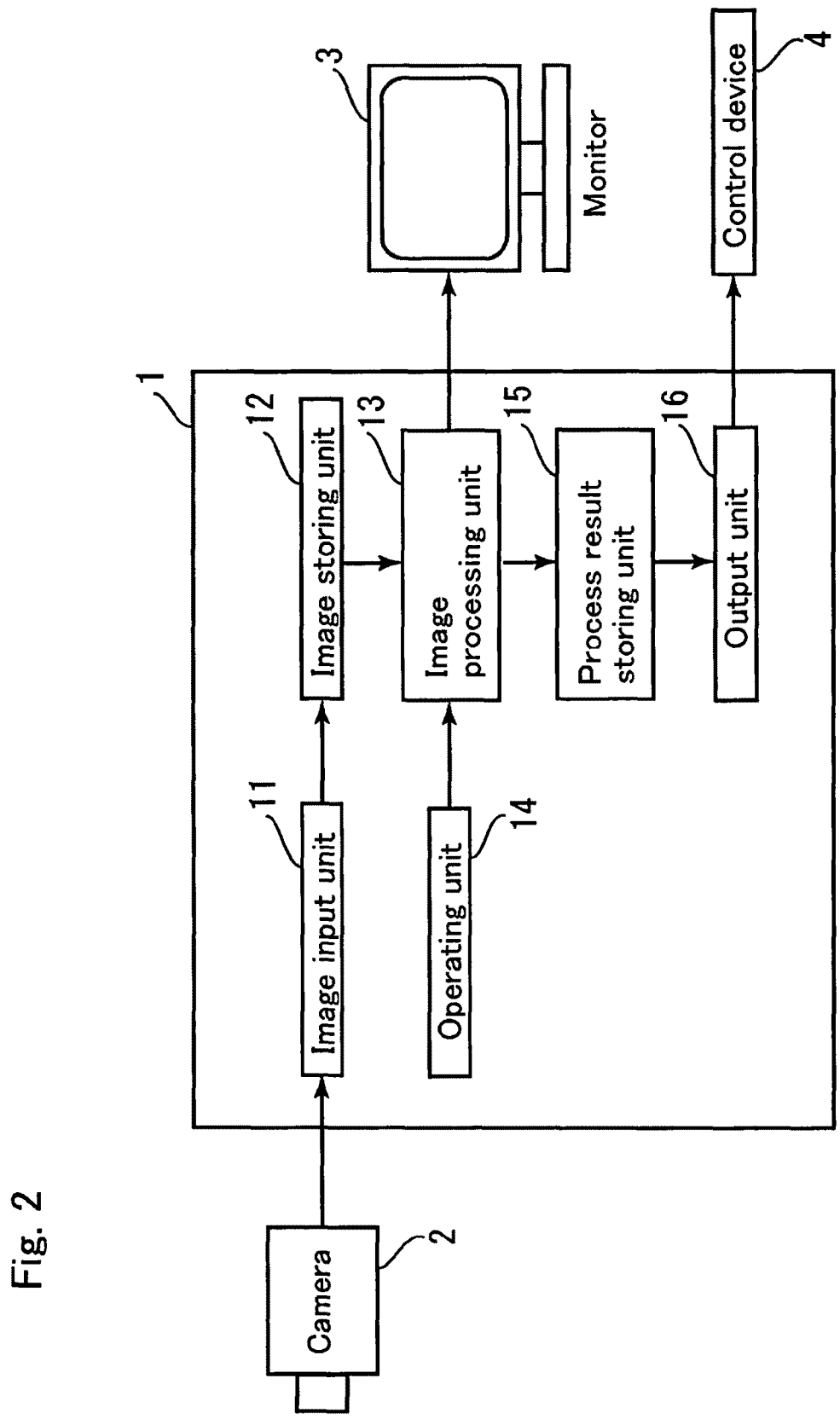
FIG. 2 is a block diagram of an image processing apparatus.

FIG. 2 is a diagram showing functional blocks of the image processing apparatus 1. The image processing apparatus 1 has, as shown in the Figure, an image input unit 11, an image storing unit 12, an image processing unit 13, an operating unit 14, a process result storing unit 15, and an output unit 16.

An image captured by the camera 2 is input to the image processing apparatus 1 by way of the image input unit 11 and once stored in the image storing unit 12. The image-processing unit 13 executes a process of extracting each character from the captured image stored in the image storing unit 12 and a character recognizing process corresponding to each character. The present invention is characterized by the character extracting process, and the details of the character extracting process will be described later. For the character recognizing process, a known method is used. The character recognition result is stored in the process result storing unit 15. The process result data is output to the outside by the output unit 16 and, for example, the control device 4 is controlled according to the process result data.

The image processing apparatus 1 also has the operating unit 14. The operating unit 14 is constructed of, for example, dials, key buttons, and the like. By operating the operating unit 14, the user can provide various instructions to the image processing apparatus 1. For example, parameters of the image processing and the like can be set. On the monitor 3, a screen for setting process parameters, for showing a process result, and the like are displayed. By referring to the screen displayed on the monitor 3, the user sets the parameters and recognizes the process result.

Character Extracting Method

Figure 3:
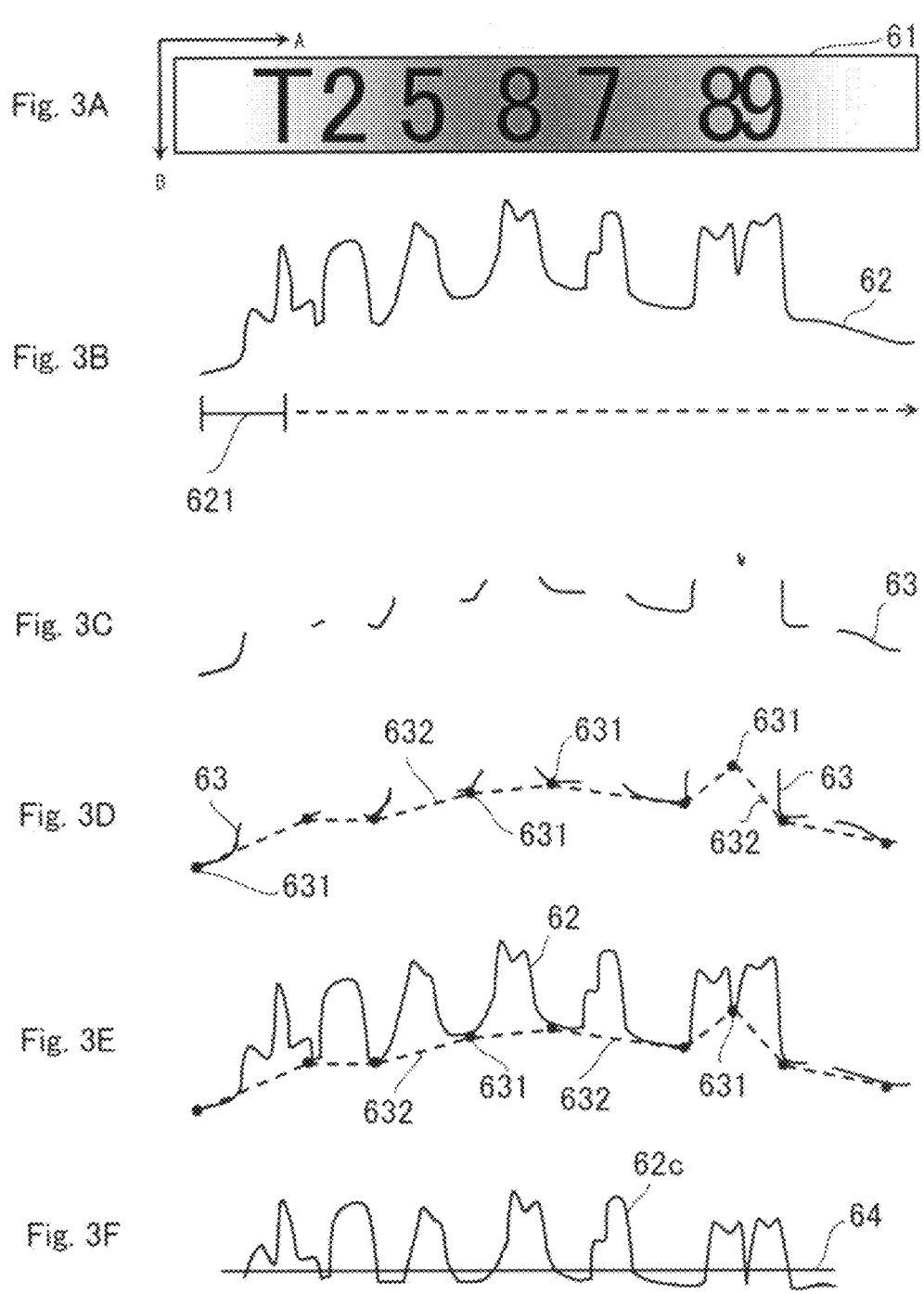
FIGS. 3A, 3B, 3C, 3D, 3E and 3F are diagrams showing the procedure of the character extracting steps.

Referring now to FIG. 3, the character extracting method of the present invention will be described. The character extraction step is a preprocessing step of recognizing characters included in a captured image and is a process of extracting the area of each of the characters included in a character string in a captured image. In the character extracting process, a line including the character string is extracted from the captured image and each of the characters of the character string is extracted from the character string.

FIG. 3A is a diagram showing an image 61 of a line (a character string) extracted. In other words, the image 61 includes the character string to be extracted. A size of a rectangular shaped window to surround all the character string to be extracted is automatically decided based on the following conditions. A width of the rectangular shaped window is decided by an extraction starting character's position and an extraction ending character's position in an extraction direction. For example, when the extraction direction is from the left side to the right side in FIG. 3A, the extraction starting character's position is the most left side positioning part of the "T" character and also the extraction ending character's position is the most right side positioning part of the "9" character. Based on this position information, the width of the rectangular shape window is decided. In the present embodiment of the present invention, as shown in FIG. 3A, the width position is decided by position information of the characters "T" and "9" with an additional outward margin each of the position information characters "T" and "9". A height of the rectangular shape window is decided by positions of the highest part and the lowest part of all the characters included into the character string to be extracted. That is, the image 61 as shown in FIG. 3A includes the character string having a plurality of characters "T258789". The height of the image 61 corresponds to height of the characters in the image 61.

Directions A and B are defined as shown in the Figure. The direction A will be called a character string direction A, and the direction B will be called a character extracting direction B. The direction A can be also called a line extracting direction A indicating an character string arrangement direction to be extracted. As shown in the Figure, the direction A is orthogonal to the direction B. In other words, the direction B is defined to be orthogonal to the direction A, after the character string is extracted. That is, the image 61 is an image extracted in the line extracting direction A from the captured image and, in a following process, extraction in the character extracting direction B is performed, thereby extracting character areas corresponding to each character from the image 61.

FIG. 3B is a diagram showing a pixel value integration evaluation value obtained by integrating pixel values in the character extracting direction B of the image 61 at each coordinate position in a character string direction A. A pixel value integration evaluation value is calculated at each of the pixel positions (coordinate positions) in the character string direction A and expressed as waveform data 62. The waveform data 62 is used as data for evaluating a character area. That is, different from the background part, in the area in which a character exists, the pixel value integration evaluation value is large, and the character area can be evaluated.

To largely express the waveform data 62 in the character areas, in case where characters are in black, the characters are reversed, and the pixel value integration evaluation value is obtained. That is, the image 61 is a monotone image in which the pixel value (density) is, for example, 0 to 255. In the case where the background is black and the character color is white, the character part has a high brightness. Consequently, it is sufficient to use a value obtained by integrating pixel values as a pixel value integration evaluation value. When the background is white and the character color is black, the character part has a low brightness. Consequently, the pixel values 0 to 255 are converted to pixel values 255 to 0. A value obtained by integrating the reversed pixel values is employed as a pixel value integration evaluation value. Therefore, irrespective of the character color which is black or white, the character part can be handled in the same manner so that the pixel value integration evaluation value becomes large.

A scan section 621 shown in FIG. 3B, is utilized to determine a section minimum value. The scan section 621 is shifted to the waveform data 62 along the character string direction A and then at each of the shifted positions of the scan section, the section minimum value of the pixel value integration values within the scan section is obtained. FIG. 3C shows plotted the section minimum values corresponding to each of the shifted positions of the scan section. Namely, FIG. 3C shows an aggregate of the section minimum values selected from the waveform data 62. As described the below, a width of the scan section is slightly larger than a predetermined value as an expected character width. Accordingly, each of the section minimum values indicates a point disposed at an area positioning between characters.

FIG. 3D is a diagram showing plotted block minimum value points 631. Each block minimum value point 631 is obtained as minimum integrated pixel value from a section minimum value block formed from a sequence of the section minimum values 63. Namely, at first, it is focused to find out a point aggregate comprising a plurality of and a sequence of the section minimum values as the section minimum block along the character string direction A, and then it is obtained minimum integrated pixel values as the block minimum value point from each of all of the section minimum blocks.

Further, values between one block minimum value point and the adjacent block minimum value point are calculated by a linear-interpolation method. FIG. 3D shows a plurality of plotted points as base points 632 calculated by linear-interpolation with the block minimum value points 631 along the character string direction A. The obtained base points 632 express the integrated pixel values of the background portion, especially between each of the characters excepting an effect caused by the shading.

FIG. 3E shows the plotted base points 632 overlapping with the waveform data 62 shown in FIG. 3B. The block minimum value points 631 are included in the base points 632.

FIG. 3F shows a compensation pixel value integration evaluation value that subtracts the base point corresponding to each pixel position (coordinate position) from the pixel value integration evaluation value corresponding to each pixel position (coordinate position) along the character string direction A. The compensated waveform data 62C express each of the compensated pixel value integration evaluation value at each pixel position (coordinate position) along the character string direction A. Thus, by subtracting the base point 632 from the pixel value integration evaluation value at each pixel position (coordinate position), the compensated pixel value integration evaluation value can be expressed by a relative changing of the pixel value against the background.

By the above-mentioned processing technique, the original waveform data 62 is compensated and the compensated waveform data 62C is generated. As shown in FIG. 3B, at the original waveform data 62, the central portion of the image is dark and it is brightening toward both end portions. In other words, since the pixel value is reversing between bright and dark, the pixel integration value of both end portions is lower than the central portion. However, since variations of the light and shade with the image are compensated by subtracting the base point 632 at each pixel position from the waveform data 62, the compensated waveform data 62C can express the waveform data corresponding to the character portion relative to the waveform data corresponding to the background portion as shown in FIG. 3F.

By setting a threshold 64 to a position shown in FIG. 3F, the character "T" can be also extracted precisely as the character area. In the conventional case shown in FIG. 7, since the lateral portion of the character "T" has smaller pixel integration values, it is difficult to recognize the lateral portion as the character area. However, according to the method of the present invention, the shading is removed from the original waveform data by subtracting the base points 632. Therefore, it is possible to extract the character area precisely even at some areas having relatively smaller pixel value integration evaluation values.

Further, the characters "8" and "9" can be recognized as each character with the threshold 64 shown in FIG. 3F. In the conventional case shown in FIG. 7, since the overlapping portion between the characters "8" and "9" has larger pixel integration values, it is difficult to recognize the overlapping portion as the boundary area between the characters. However, according to the method of one embodiment of the present invention, since the pixel value integration evaluation values of the overlapping portion are relatively smaller than the pixel value integration evaluation values of the other adjacent character area, the pixel value integration evaluation values of the overlapping portion are adapted as the block minimum value points. By adapting the pixel value integration evaluation values of the overlapping portion as the block minimum value points, the pixel value integration evaluation values is compensated and becomes relatively smaller on the compensated waveform data 62C. Therefore, the overlapping portion can be recognized as the character boundary area.

Flow of the Processes

Figure 4:
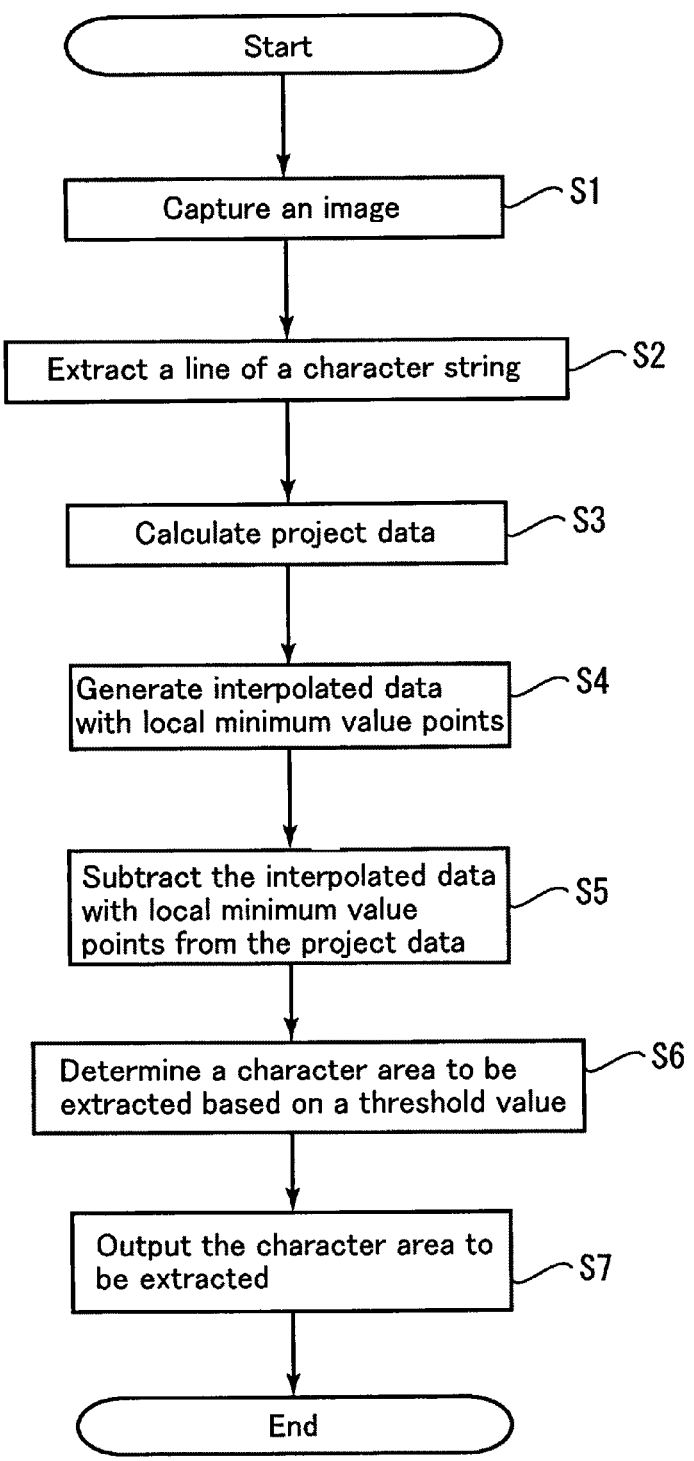
FIG. 4 is a general flowchart of the character extracting process.
Figure 5:
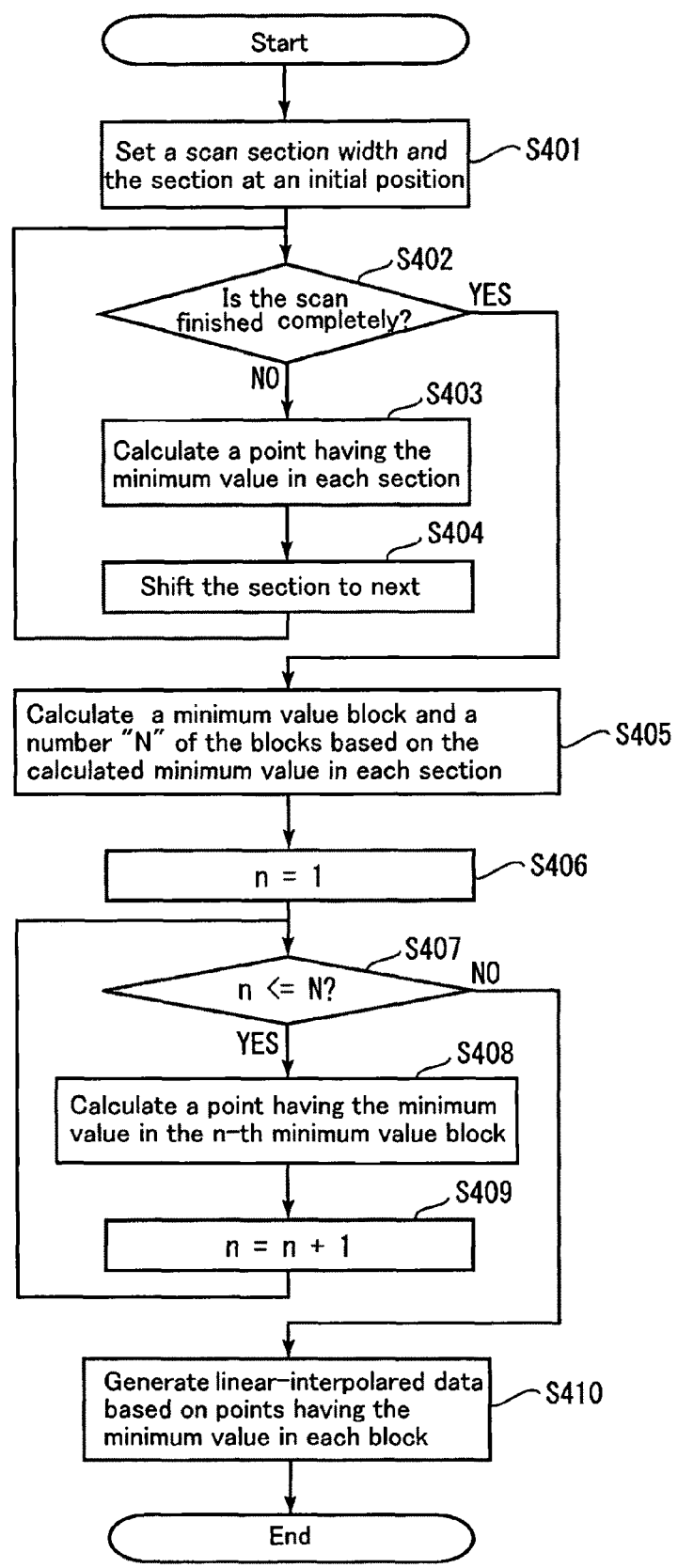
FIG. 5 is a detailed flowchart of Step S4 as shown in FIG. 4.

Next, the flow of the character extracting process will be described with reference to the flowchart of FIGS. 4 and 5. The character extracting process includes, as described above, extraction in the line extracting direction A and extraction in the character extracting direction B. The extracting method of the present invention can be applied to both of the extracting processes. The flowcharts of FIGS. 4 and 5 show the process flow common to both of the extracting processes. A process of extracting a character from a line extracted from an image, in the character extracting direction B will be described as an example. Especially, FIG. 4 is a flowchart showing a whole processing sequence for extracting the characters and FIG. 5 is a flowchart showing the generating process of a local minimum point compensation data in more detail.

In FIG. 4, at Step S1, the camera 2 captures the character 81 printed on the medium 80, the image input unit 11 inputs the captured image, and then the image storing unit 12 stores the captured image.

The following processes from Step S2 are executed at the image processing unit 13. At Step S2, the image processing unit 13 inputs the captured image and then executes an extraction of a character string from the captured image. In more detail, an area including a character string is recognized, and then the image including the character string is extracted along the character string extraction direction A. The extracted image is corresponding to the image 61 shown in FIG. 3A.

At Step S3, the image processing unit 13 generates project data. It is calculated the pixel value integration evaluation value that integrates the pixel values along the character extracting direction B at each pixel position (coordinate position) in the character string direction A. Thus, the calculated pixel value integration evaluation value is the waveform data 62 shown in FIG. 3B.

At Step S4, the processing unit 13 generates data interpolated with the local minimum value points. The meaning of the local minimum value is the pixel integration value corresponding to a background portion of the image. In a detail, the local minimum value is the block minimum value point explained above in FIG. 3D. Further, the data interpolated with the local minimum value points has assumed inconsistencies in the shading of the image and obtained from the pixel value integration evaluation values corresponding to the background portion of the image. In detail, the data interpolated with the local minimum value points is the base point 632 interpolated with the block minimum value points 631.

FIG. 5 shows a detailed flowchart to explain the process regarding the Step S4 for generating the data interpolated with the local minimum value points. The following process is to extract a minimum value from integrated pixel values as the pixel value integration evaluation values in the section having a predetermined width along the character string direction A, and to extract a coordinate position having the extracted minimum value along the character string direction A. Then, the section is shifted by a predetermined width. It is also executed in each of the sections corresponding to each shifted position along the character string direction A over the captured image. Further, a width of the section, an initial position of the section and a shifting width of the section are set prior to the above-mentioned process being executed.

In detail, a width of a scan section is set, and then the scan section is set at a preset initial position (Step S401). The scan section is corresponding to a scan section 621 shown in FIG.

3B. The width of the scan section may be set to a preset value or as the described below, the width of the scan section may be manually set with the operating unit 14. Then, the scan section is set to an initial position. For example, as shown in FIG. 3B, the scan section may be set to a location at a left end portion of the image 61 including the character string, namely at an extracting position disposed on a left side of the character string, as the initial position.

Next, it is determined whether a scan process is finished by the image processing portion 13 (Step S402) or not. The scan process is to extract the minimum value and a coordinate position corresponding to the minimum value along the character string direction A all over the image to be scanned. In more detail, the scan process is the above-mentioned process to extract the minimum value of the pixel value integration evaluation values and its coordinate position in each section corresponding to each shifted position along the character string direction A over the image. In the case of the image 61 shown in FIG. 3A, the scan section 621 is shifted by a predetermined width from a left end portion of the image 61 to the right end portion of the image 61, all over the image 61.

If the image processing portion 13 judges that the scan process is not finished all over the scan sections 621 to be scanned, at a scan section 621 where the scan process is not finished, a point having the pixel value integration evaluation value which is the minimum value of the pixel value integration evaluation values in the section is extracted (Step S403). The point having the pixel value integration evaluation value which is the minimum value is extracted, then the scan section 621 is shifted by the predetermined width to the next position to be scanned (Step S404). It is preferred that the scan section 621 is shifted by a pixel width of the image 61 to execute the scan process accurately. On the other hand, It may be preferred that the scan section 621 is shifted over a pixel of the image 61 to execute the scan process faster. The predetermined width for shifting the scan section 621 may be set to a preset value or the predetermined width may manually set with the operating unit 14.

Again, the image processing portion 13 judges whether a scan process is finished for all the scan sections 621 to be scanned or not. If the image processing portion 13 judges that the scan process is not finished for all the scan sections 621 to be scanned, at a scan section 621 where the scan process is not finished, the processes of the Steps S403 and S404 are repeated. Consequently, for all the scan sections 621 to be scanned, the point having the pixel value integration evaluation value which is the minimum value in the scan section 621 is extracted at each scan section 621. Each of the points extracted in the above-mentioned process correspond to a section minimum value point 63 at each shifted position along the character string direction A as shown in FIG. 3C.

If the image processing portion 13 judges that the scan process is finished for all the scan sections 621 to be scanned (YES at the Step S402), an aggregation corresponding to a sequence of the section minimum value points 63 extracted at through Steps S402 to S404 is extracted as a minimum value block. Then the total number N of the minimum value blocks is calculated (Step S405). When a distance between neighbor section minimum value points 63 is not in excess of a predetermined threshold value, the neighbor section minimum value points 63 are defined as in sequence. On the other hand, when a distance between neighbor section minimum value points 63 is in excess of a predetermined value, the neighbor section minimum value points 63 are defined as out of sequence. Accordingly, the aggregation corresponding to a sequence of the section minimum value points 63 is defined so that the section minimum value points 63 is arranged in a string shape, and each of neighbor the section minimum value points 63 along the string form is in sequence all over the string form. It is preferred to set the predetermined threshold value utilized in the decision whether the neighbor section minimum value points 63 are in sequence or not, to be substantially the same as the width by which the scan section 621 is shifted or slightly more. For example, when the scan section 621 is shifted with a pixel of the image 61, the predetermined threshold value is set to be substantially the same as a pixel of image 61 or slightly more.

At Step S406, a variable n is set to numeral "1" by the image processing portion 13. At Step S407, it is checked whether the variable n is below the total number N of the extracted minimum value blocks or not. When the variable n is below the total number N, a point having the minimum value (the local minimum value) in the n-th minimum value block is calculated (Step S408). That is, the point, the block minimum value point 631, having the minimum value of the pixel value integration values in the n-th minimum value block is calculated.

The variable n is incremented by numeral "1" (Step S409). The process at the Step S408 is repeated until the variable n is in excess of the total number N of the extracted minimum value blocks. Consequently, since one block minimum value point 631 is calculated at each minimum value block, a number N of the block minimum value points 631 is calculated in correspondence with the total number N of the minimum value blocks.

When the variable n is in excess of the total number N of the extracted minimum value blocks (NO in the Step S407), the process proceeds to the following step, Step S410. At Step S410, data is linear-interpolated between the block minimum value points 631 obtained at through Step S407 to S409. The linear-interpolated data is corresponding to the base value 632 shown in FIGS. 3D and 3E.

With returning to the main flow shown in FIG. 4, the base value 632 is calculated at each coordinate position along the character string direction A. Then, a process to subtract data interpolated with the local minimum value points from the project data is executed (Step S5). That is, the image processing portion 13 subtracts the base value 632 from the waveform 62 at each coordinate position along the character string direction A. Consequently, the compensated waveform data 62c is generated.

A character extracting area is determined with a threshold 64 (Step S6). The threshold 64 may be predetermined value or as explained below, the threshold 64 may be adjusted by using the operating unit 14.

The character extracting area is output according to the set threshold 64 by the image processing portion 13 (Step S7). That is, an area having the (compensated) pixel value integration evaluation value in excess of the threshold 64 is extracted as the character area based on a result of a comparison of the compensated waveform date 62c with the threshold 64.

In the above-mentioned embodiment, the scan section 621 is shifted to calculate the section minimum value point 63. However, the present invention is not limited to that embodiment. For example, a plurality of the scan sections 621 overlapping each other may be simultaneously set all over the image 61.

According to the image processing system of the above-mentioned preferred embodiment, in the case where the shading occurs in the captured image, that is, in the case where uneven brightness occurs in the captured image caused by the influence of a lens feature of an image acquisition device or the influence of an illumination, it is possible to extract the desired character included in the captured image accurately by the compensation of the pixel value integration evaluation values based on the present invention.

Moreover, in the case where an interval of the neighbor characters is narrow and the neighbor characters are partially overlapped with each other, since the pixel value integration evaluation values are compensated, the image processing system can detect a character boundary area having the pixel value integration evaluation value relatively lower than the pixel value integration evaluation value at the neighbor characters area.

Figure 8A:
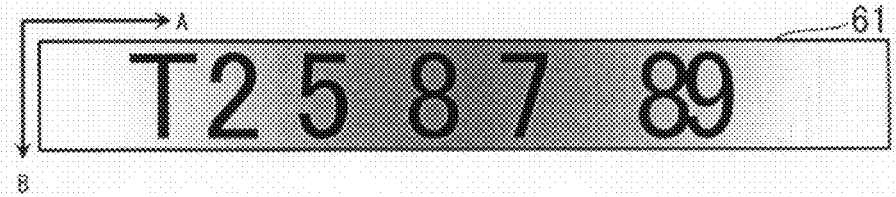
FIGS. 8A, 8B, 8C, 8D, 8E and 8F are diagrams showing another procedure for the character extracting steps.
Figure 8B:
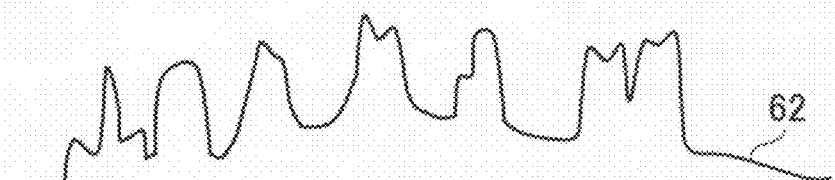
Figure 8C:
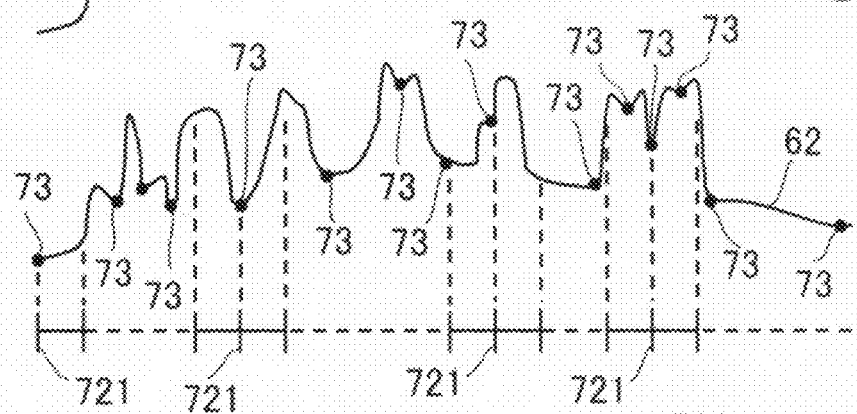
Figure 8D:
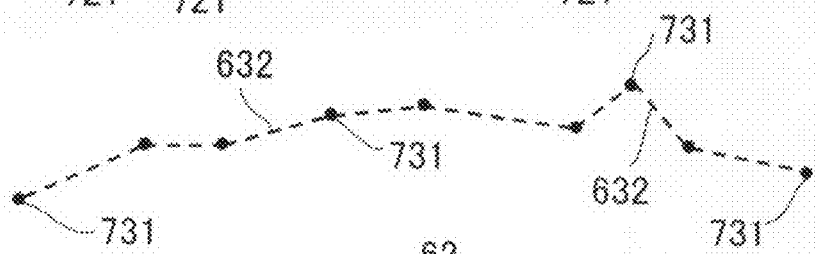
Figure 8E:
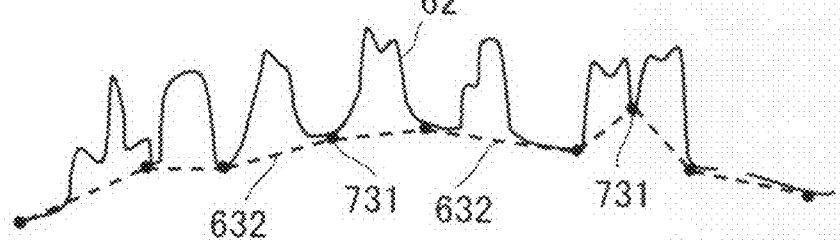
Figure 8F:
Figure 9:
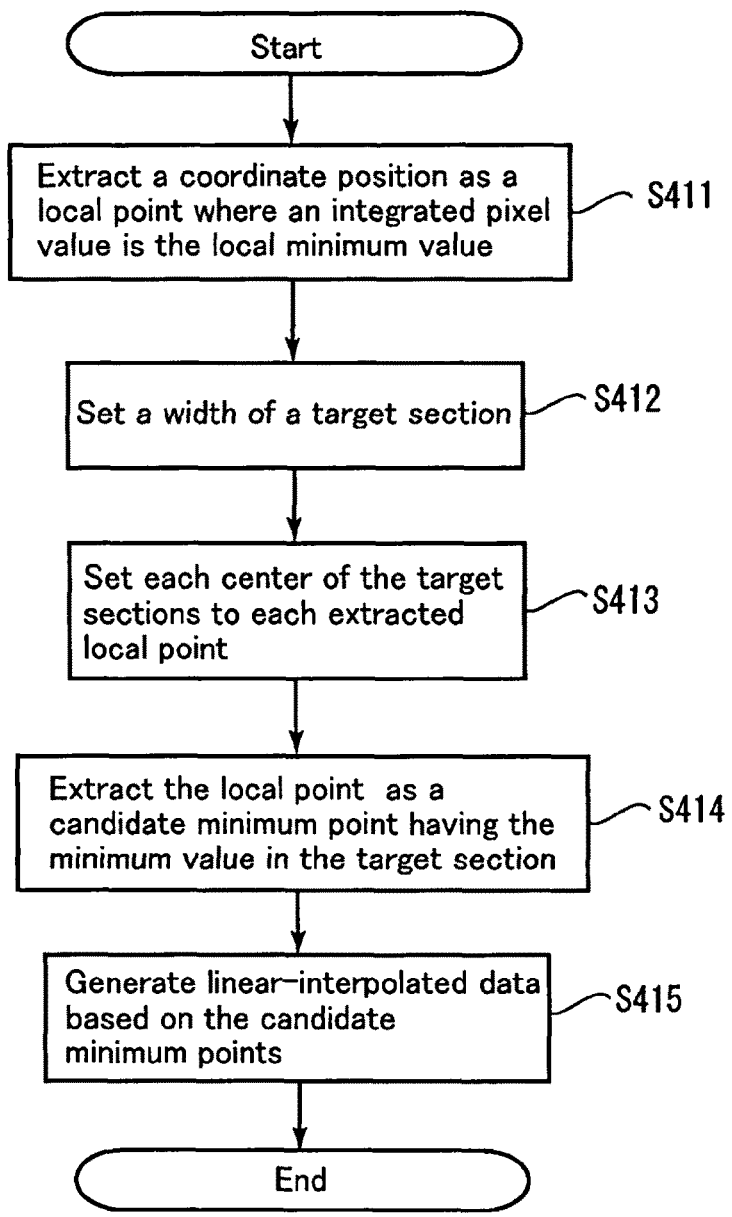
FIG. 9 is another detailed flowchart of Step S4 as shown in FIG. 4.

Referring to FIGS. 8 and 9, another preferred embodiment (a second embodiment, hereinafter) will be described below. FIG. 8 is corresponding to FIG. 3 related to the above-mentioned first embodiment. FIG. 9 is also corresponding to FIG. 5 related to the first embodiment. The present second embodiment is substantially the same as the first embodiment except for the process for generating data interpolated with the local minimum points at the Step S4 shown in FIG. 4. Therefore, FIGS. 1, 2, 4 and 6 will be further referred to in the description of the second embodiment.

A process shown in FIGS. 8A and 8B is corresponding to calculation of a project data at the Step S3 shown in FIG. 4. FIG. 8A is a diagram showing an example of performing the character extracting method on the image 61. FIG. 8B is a diagram showing the pixel value integration evaluation values calculated from a sum of the pixel values along the character extracting direction B as the waveform data 62.

Referring to FIGS. 8C to 8E and FIG. 9, a process to generate data interpolated with the local minimum points as shown at the Step S4 in FIG. 4 will be described in detail.

FIG. 9 is a detailed flowchart showing the data interpolated with the local minimum points according to the second embodiment. The data utilized to compensate represents uneven brightness and the like on the background of the captured image. A position corresponding to the background portion of the image 61 is calculated based on the integrated pixel value at each coordinate position along the character direction A. Then, the uneven brightness all over the image 61 is supposed based on the pixel value integration evaluation values at the positions calculated as the background portion of the image 61.

A coordinate position where the integrated pixel value, the pixel value integration evaluation value, is the local maximum value is extracted at each coordinate position along the character string direction A over the image 61 to extract a candidate of a position which is the supposed background portion of the image 61. In more detail, it is compared between the pixel value integration evaluation value at each coordinate position and a pixel value integration evaluation value corresponding to the neighbor of the coordinate position along the character string direction A. Then, when the pixel value integration evaluation value at the coordinate position is lower than the pixel value integration evaluation values at both neighbors of the coordinate position along the character string direction A, the coordinate position is determined as the coordinate position where the pixel value integration evaluation value is the local minimum value. FIG. 8C is a diagram showing the pixel value integration evaluation values at each coordinate position along the character string direction A as waveform data 62 and a point corresponding to each of the coordinate positions extracted at the Step S411 is plotted as a local minimum point 73 on the waveform data 62.

All over the local minimum points 73 extracted in the Step S411, it is determined whether the local minimum point 73 is in the supposed background area of the image 61 or not. When the local minimum point 73 is in the supposed background area of the image 61, the local minimum point 73 is extracted as a candidate minimum point 731. The determination whether a point is in the supposed background area or not, will be described in more detail with referring to FIGS. 8A and 8C. The local minimum point 73 has the minimum value of the pixel value integration evaluation values in the neighboring area. Referring to a portion corresponding to the character "7" in FIGS. 8A and 8C, when the local minimum point is in the character area, naturally it is not in the background area of the image 61. In the case where the area to be searched of the local minimum point 73 is expanded, the area to be searched of the local minimum point 73 includes the background area of the image 61. In such a case, since the pixel value integration evaluation values at a background area are lower than the pixel value integration evaluation values at a character area adjacent to the background area, the local minimum point 73 at the character area of the image 61 does not have the minimum value in the expanded area to be searched. On the other hand, referring to FIGS. 8A and 8C, at a portion corresponding to between the character "8" and "9", in case where the local minimum point 73 is in the background area of the image 61 and the area to be searched of the local minimum point 73 is expanded, since an area having the pixel value integration evaluation values which are higher than the pixel value integration evaluation values in an original area is added to the original area, the local minimum point 73 at the background area of the image 61 has the minimum value in the expanded area.

A section 721 is utilized to search the minimum value of the pixel value integration evaluation value. At Step S412, the width of the section 721 is set. The width of the section 721 may be set to a preset value or the width of the section 721 may be manually adjusted with the operating unit 14. It is preferred that the width of the section 721 is set with consideration about the width of the characters in the image 61. That is, if the width of section 721 is substantially the same as the width of characters or more, at least part of the background area in the image 61 is included in the section 721. In such a case, if the local minimum point 73 is extracted at the character area in the Step S411, since the pixel value integration evaluation value at local minimum point 73 is not the minimum value in the section 721, the local minimum point 73 is recognized as existing in the character area. Each of the sections 721 includes each of the corresponding local minimum points 73. For example, a local minimum point 73 may be located at the center of a section 721. As above-mentioned, each center of the section 721 to be searched is set at each of the local minimum points 73 and the width of the section 721 is set to substantially the same as the width of the characters to be extracted or slightly more. (This can be 110% to 120% of the width of the characters to be extracted).

As shown in FIG. 8C, at Step S413, each of the centers of the sections 721 which has the width set at the Step S412 is set at each local minimum point 73. At each section 721 to be searched, the minimum value of the pixel value integration evaluation values in the section 721 are compared with the pixel value integration evaluation value corresponding to the local minimum point 73 related to the section 721. At Step S414, when the pixel value integration evaluation value corresponding to the local minimum point 73 is the minimum value in the section 721 to be searched as shown in FIG. 8D, the local minimum point 73 is extracted as a candidate minimum point 731.

It is preferred that the diagnosis of whether the extracted candidate minimum point 731 is an extraordinary point, namely the extracted candidate minimum point 731 is not a proper point in the supposed background area, is carried out.

In more detail, it may be the diagnosis of whether the pixel value integration evaluation value at the candidate minimum point 731 is excessively low or not (excessively low is extraordinary), or it may be the diagnosis of whether the pixel value integration evaluation value at the neighboring point of the candidate minimum point 731 is a minimum value in a preset section except for the candidate minimum point 731 or not ("Not" is extraordinary). When the candidate minimum point 731 is determined as the extraordinary point, since the candidate minimum point 731 should not be extracted, the candidate minimum point 731 may be excluded from the target of the process for extracting the character area. The diagnosis may be carried out next to the Step S3, or prior to Step S416 as described below.

The following process is substantially the same as the process in the first embodiment in which the section minimum value point 631 is used instead of the candidate minimum point 731. At Step S415, as shown in FIG. 8D, at each coordinate position along the character string direction A, a base value 632 at the coordinate position is calculated based on interpolation with the pixel value integration evaluation value at the candidate minimum points 731 extracted at the Step S414. At Step S415, a process to subtract the data interpolated with the local minimum points based on the base points 632 from the project data as the waveform date 62 is executed. That is, at each coordinate position along the characters string direction A, the process to subtract the base value 632 from the waveform data 62 is executed. As a result of the above-mentioned process, a compensated waveform data 62c as shown in FIG. 8F is generated.

At Step S6, an area including the character to be extracted is determined based on a preset threshold 64 by the image processing portion 13. The preset threshold 64 may be set to a predetermined value or the preset threshold 64 may be manually adjusted with the operating unit 14 as described to the below.

At Step S7, the area including the character to be extracted is output based on the threshold 64. That is, it is compared between the compensated waveform data 62c and the threshold 64, and then, in the compensated waveform data 62c, an area having the (compensated) pixel value integration evaluation value in excess of the threshold 64 is extracted as the character area. After the whole character areas are extracted, a process to recognize the character at the extracted character area is carried out by the image processing portion 13.

According to the above-mentioned image processing system of the second embodiment of the present invention, in the case where shading occurs in the captured image, that is, in the case where uneven brightness occurs in the captured image caused by the influence of lens characteristics of an image acquisition device or the influence of an illumination, it is possible to extract the desired character included in the captured image accurately by the compensation of the pixel value integration evaluation value based on the present invention.

Moreover, in the case where an interval of neighbor characters is narrow and the neighbor characters are partially overlapped with each other, since the pixel value integration evaluation values are compensated, the image processing system can detect a character boundary area having the pixel value integration evaluation value relatively lower than the pixel value integration evaluation value at the neighbor characters area.

User Interface

Figure 6:
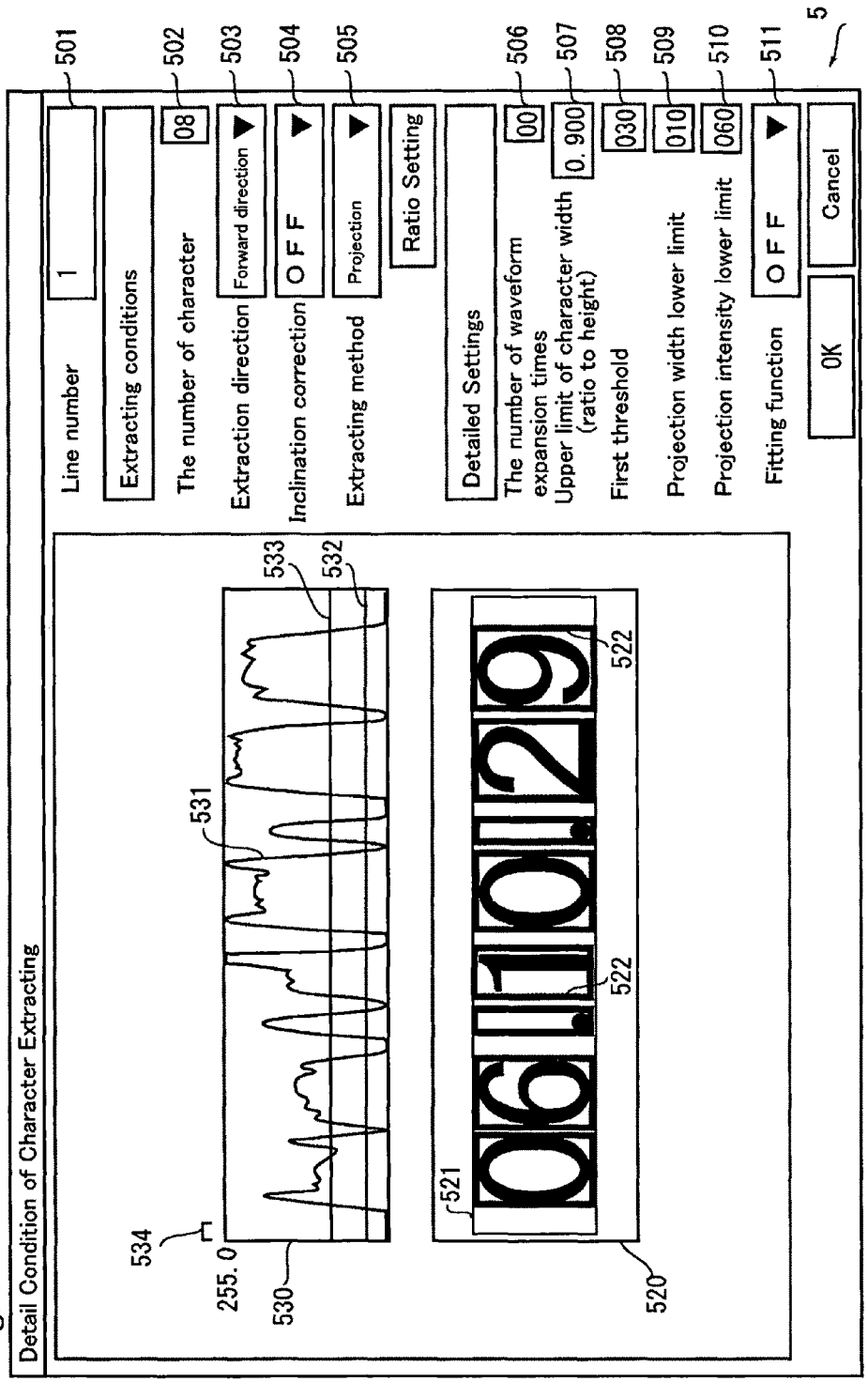
FIG. 6 is a diagram showing a user interface of the character extracting process.

FIG. 6 is a diagram showing a setting confirmation screen 5 displayed on the monitor 3 at the time of executing the character extracting process. The setting confirmation screen 5 has setting parts 501 to 511 arranged on the right side of the screen and an image process area 520 and a waveform display part 530 disposed in the center of the screen. The user can adjust the character extracting process by operating the operating unit 14 to change the parameters in the setting parts 501 to 511 while seeing an image displayed in the image process area 520 and a waveform 531 displayed in the waveform display part 530. A rectangle 521 in the image process area 520 shows the line extraction area. Further, a positioning relationship between the image process area 520 and the waveform display part 530 on the setting confirmation screen 5, is determined so that each character displayed on the image process area 520 is in the same position of a part of the waveform displayed on the display part 530 corresponding to the character displayed on the image process area in the line extracting direction A.

Accordingly, it is easy to understand the positioning relationship between specified character displayed on the image process area 520 and a part of the waveform displayed on the waveform display part 530 corresponding to the specified character displayed on the image process area 520. At this embodiment, the waveform display part 530 is disposed at an upper part of the setting confirmation screen 5 and the image process area 520 is disposed at a lower part of the setting confirmation screen 5. However, to obtain the above-mentioned effect, it is also preferred that the waveform display part 530 is disposed at the lower part of the setting confirmation screen 5 and the image process area 520 is disposed at the upper part of the setting confirmation screen 5.

The image process area 520 is an area displaying an image including characters to be processed. In the Figure, an image of a medium on which the date (06.10.29) is printed is displayed. In the image process area 520, extracted character areas are displayed so as to be surrounded by rectangles 522. The Figure shows a state where each of the characters "0", "6", and the like are surrounded by a rectangle 522 and extracted as a character area. The user can recognize the character extraction state by seeing and checking the display.

As shown in FIG. 6, a compensated waveform data 531 corresponding to the compensated data 62c shown in FIG. 3F is displayed on the waveform display part 530. That is, a waveform compensated with a subtraction of the base value 632 from the pixel value integration evaluation value is displayed. A threshold value is also displayed on the compensated waveform data 531. By seeing and checking the display, the user can know the relation between the waveform and the first and second thresholds and an area to be extracted as a character area in relation with the thresholds.

On the lower part of the waveform display part 530, a scan section 533 corresponding to the scan section 621 is displayed. That is, as in the above-described in FIGS. 3B and 3C, the section minimum value points 63 are calculated over the scan sections 621 shifted along the character string direction A. The scan section 533 is displayed on the waveform display part 530 so that it is easy to understand the relation between the scan width and, the image or the waveform 531. It is possible to manually adjust a width of the scan section 533 (an upper limit of the character width) with a setting part 507 for inputting a setting value. As shown in FIG. 6, the width of the scan section 533 is set to a width based on an aspect ratio of the character height to the character width. The character height is a height of the extracted line. In response to the change of the width of the scan section 533, the scan minimum value point is changed. Consequently, the compensated waveform is changed. The display of the compensated waveform data 531 is immediately changed in response to the operation of the change. It is possible to manually change the scan section 533 referring to the displayed compensated waveform.

It is preferred that a linear-interpolated wave is displayed on the waveform display part 530. That is, it is preferred that a wave regarding the base values 632 shown in FIGS. 3D, 3E, 8D and 8E. In this case, the display of the wave of the base values 632 is immediately changed in response to the operation of the change for the scan section 533.

By entering a setting value in a setting part 508, the user can change the value of a threshold 532 (extraction threshold). In the case of no-input of any value to this setting part by the user, a value "40" is set as a default value of the threshold 532. In this embodiment, one of the value "0" through the value "255" can be set as a desired threshold value and the higher value is corresponding to a character part. Accordingly, when the user does not input any value into the setting part 508, automatically the threshold 532 is displayed at a position indicating "40" as a value on the image process area 520. When the threshold 532 is changed by the user, the character extraction position is also changed, so that the position and the size of the rectangle 522 displayed in the image process area 520 is also changed. In such a manner, the user can recognize the character extraction position while changing the threshold 532.

As above-described, it is possible to manually set the scan section 533 with the setting part 507. Further, the width of the scan section 533 may be set to a width substantially the same as the width of the character or slightly more as a default value. For example, the default value of the width of the scan section 533 is 110% to 120% of the width of the character so that the character area is extracted accurately. The slightly wider width of the scan section 533 rather than the character width is an optimum value for extracting the section minimum value points 63. If the width of the scan section 533 is narrower than the character width, the section minimum value point 63 in the character area of the image may be calculated wrong. Then, the pixel value integration evaluation value in the character area is calculated lower than the proper compensated pixel value integration evaluation value. On the other hand, if the width of the scan section 533 is too wide, in case of an example shown in FIG. 3, at the boundary portion between the characters "8" and "9", the section minimum value point 63 may not be extracted. Consequently, the characters "8" and "9" may be misunderstood as one character.

It is preferred that the scan section 533 is automatically set based on the height of the character. As above-described, at the Step S2, the captured image is extracted along the line direction. The width of the scan section 533 is determined based on multiplication of the height of the character and a predetermined ratio. In this case, it is possible that the width of the scan section 533 is automatically adjusted properly in response to enlargement or reduction of the size of the character image according to the condition of the acquisition. For example, if the aspect ratio of the character is decided at least roughly corresponding to a specification of the product as the object to be captured, it is preferred that the aspect ratio to be utilized for setting the width of the scan section 533 is set by the decided aspect ratio. It is preferred that the aspect ratio is manually set.

The meaning of the other setting parts 501 to 511 will be described. A setting part 501 can set the line number. When there is a plurality of character strings in the acquisitioned image, for example, each character string is given a corresponding number automatically in the image processing apparatus. Accordingly, the user designates a specified character string by using the corresponding number to the specified character string. Thus, the designated character string is displayed on the image process area 520. A setting part 502 can set the number of characters to be extracted. In a case where the number of characters to be extracted is determined in advance, the number of characters is set in the setting part 502. In more detail, the number of character to be extracted can be determined with one of a forward direction, a backward direction or in order based on a character size which will be described below at a setting part 503. By these settings, the character extraction precision can be improved and also only the characters required to be extracted by the user can be extracted with the other extraction conditions. The setting part 503 can set the extraction direction of the characters to be extracted. In the present embodiment, the setting part 503 can be set as one of "Forward direction", "Backward direction" and "In order based on character size". "Forward direction" means starting extraction of the characters from the left side of the image process area 520 in FIG. 10. "Backward direction" means starting extraction of characters from the right side of the image process area in FIG. 10 namely, an opposite direction to "Forward direction". "In order based on character size" means extracting the character from the character string in order based on the larger size of the character in the character string. As another embodiment to the setting part 503, since this setting part basically is required to decide the direction to start extraction of character, it is enough to provide only "Forward direction" and "Backward direction" as items to be selected. A setting part 504 can be selected so that inclination correction is made or not. When characters are inclined to the arrangement direction of the character string, for example italicized characters, projection data (pixel value integration evaluation values) of the neighboring characters overlap each other. Therefore, whether a process of correcting an inclined character is performed or not is set. When it is set "ON" at the setting part 504, the image processing apparatus 1 detects the inclined angle of the characters of the character string and produces a corrected and non-inclined character string based on the detected inclined angle automatically. Then, the extracting processing is carried out to the corrected character string. When this inclination correction is not required this inclination correction, the user may select "OFF". A setting part 505 can set an extraction method. In detail, "Projection" and "Ratio Designation" are provided as the extraction methods to be selected. The extraction using "Projection" can be carried out for each character extraction based on the pixel value integration evaluation value obtained by integrating pixel values along the orthogonal direction to the arrangement direction of the character string at each pixel position of the arrangement direction of the character string to be extracted. On the other hand, the extraction using "Ratio Designation" can be carried out based on the same function of the extraction of the "Projection" with setting a position of a character to start the extraction and a position of a character to finish the extraction and the size of a space between characters to be extracted. Therefore, when "Ratio Designation" is selected, another dialog box (not shown) appears on the monitor 3 and the positions to the above-mentioned setting parameters can be specified based on giving values which are defined numerals 0 through 100 as the coordinate position corresponding to a first character through a final character existing in the character string.

A setting part 506 can set the number of waveform expansion times. The setting is made to prevent the waveform from forming the waveform intermittently. This setting part function is available for character forming by dot aggregate. In the other words, since a character formed by a dot aggregate has a space between the dots, the pixel value integration value of the position corresponding to the space is extremely lower than the pixel value integration value corresponding to the other portion to the character. Therefore, the waveform corresponding to the character formed by dots may have a discontinued shape. In such a case, the discontinued-shape waveform can be changed to a continued-shape waveform by expanding each dot at least to the arrangement direction of the character string. Further, since the space size between dots is different for each character, the setting part 506 can set the number of waveform expansion times to provide an appropriate expansion size to any type of character formed by dots. A setting part 507 can set the upper limit of the character width. In the Figure, the character width is set as a ratio to the character height. The upper limit value is used for a process of separating characters in contact with each other or the like. A setting part 511 can be set whether fitting is performed or not. Fitting of the extraction area having a rectangular shape in accordance with a character shape is effective in a case where the position of a character in the vertical direction (character extraction direction) shifts. In more detail, in this embodiment, when the "Fitting Function" is not selected, each position of the upper side and the lower side of the rectangular shape extraction area surrounding each character to be extracted from the character string is fixed by a highest position to all the characters to be extracted from the character string and the lowest position to all the characters to be extracted from the character string. Therefore, in the case of some extracted character like two periods shown in FIG. 6, there is no character part to an upper space of the rectangular shape extraction area corresponding to each of the two "periods" in the Figure. This biased character layout in the extraction area is not effective for the character recognition process like a pattern matching process, since the partial space in the extraction area is a no character part and such information of the partial space has no meaning for the character recognition process. To solve such a problem, this setting part 511 is very useful. In detail, by selecting the "Fitting Function" at the setting part 511, in case of the above-mentioned "period", since it is able to provide the rectangular-shaped extraction area fitting to a height of "period", it can reduce obtaining a useless space in the extraction area and also the following image processing process, like the character recognition process, can be carried out effectively.

Further, each setting part from the setting part 501 to 511, when it is selected one condition from a plurality of selectable functions, it is preferred to use a pull-down menu selection method to select a desired function.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

This application is based on Japanese Patent Application Japanese Patent Application No. 2006-248367, filed on Sep. 13, 2006 and Japanese Patent Application No. 2007-228222, filed on Sep. 3, 2007, the contents of which are incorporated hereinto by reference.

What is claimed is:

1. An apparatus for extracting each of a plurality of characters from a character string having the plurality of characters arranged in a first direction and included in an image, comprising:
   an integrating device integrating a plurality of pixel values along a second direction orthogonal to the first direction at each of a plurality of coordinate positions along the first direction over the image;
   a setting device setting a section having a predetermined width at each of a plurality of different positions by shifting the section along the first direction over the image;
   a first extracting device extracting a first point where a pixel value integrated by the integrating device is the minimum value in each of the sections set by the setting device;
   a block setting device setting a plurality of blocks corresponding to sequences of the first points, wherein each distance between the adjacent first points in the sequence is not in excess of a predetermined threshold value;
   a second extracting device extracting a second point where a pixel value integrated by the integrating device is the minimum value in each of the plurality of blocks of first points, extracted by the first extracting device, in sequence along the first direction;
   an interpolating device calculating a base value at each of the plurality of coordinate positions along the first direction over the image from an interpolation based on the pixel values integrated by the integrating device at the second points extracted by the second extracting device;
   a compensating device subtracting the base value from the pixel value integrated by the integrating device as a compensated value at each of the plurality of coordinate positions along the first direction over the image;
   a recognition device recognizing an area having the compensated value compensated by the compensating device in excess of a predetermined threshold value as a character area; and
   a display device including a character string display part for displaying a character string having a plurality of characters and a character area display part surrounding each character included in the character area recognized by the recognition device.

2. The character extracting apparatus according to claim 1, wherein the predetermined width of the section set by the setting device is set to be substantially the same as a width of the character to be extracted.

3. The character extracting apparatus according to claim 1, wherein the predetermined width of the section set by the setting device is set to 110% to 120% of a width of the character to be extracted.

4. The character extracting apparatus according to claim 1, wherein the predetermined width of the section set by the setting device is set based on a predetermined height of the character string and a preset ratio of height to width of the character to be extracted.

5. The character extracting apparatus according to claim 1, wherein
   the display device includes a rectangular-shaped window; and further comprising:
   a waveform display part for displaying a waveform formed by the pixel values integrated by the integrating device at each of a plurality of coordinate positions along the first direction over the image; and
   wherein the display device displaying the plurality of characters displayed on the character string display part and for displaying the waveform displayed on the waveform display part at a position where each part of the waveform is disposed at each location corresponding to each character displayed on the character string display part to indicate a mutual positioning relationship between the character and the waveform on the display device.

6. The character extracting apparatus according to claim 1, further comprising:
an adjusting device manually adjusting the width of the section, and
a waveform display part for displaying a waveform formed by the compensated values compensated by the compensating device at each coordinate position along the first direction over the image.

7. The character extracting apparatus according to claim 1, further comprising:
an adjusting device manually adjusting the width of the section, and
a waveform display part for displaying a waveform formed by the base values interpolated by the interpolating device at each coordinate position along the first direction over the image.

8. The character extracting apparatus according to claim 1, wherein
the display device
includes a rectangular-shaped window; and further comprising:
a waveform display part for displaying a waveform formed by the pixel values integrated by the integrating device at each of coordinate position along the first direction over the image and the threshold value overlapping with the waveform; and
wherein the display device displaying the plurality of characters displayed on the character string display part and for displaying the waveform displayed on the waveform display part at a position where each part of the waveform is disposed at each location corresponding to each of the plurality of characters displayed on the character string display part to indicate a mutual positioning relationship between the character and the waveform on the display device.

9. An apparatus for extracting each of a plurality of characters from a character string having the plurality of characters arranged in a first direction and included in an image, comprising:
an integrating device integrating a plurality of pixel values along a second direction orthogonal to the first direction at each of a plurality of coordinate positions along the first direction over the image;
a first extracting device extracting a first point where a pixel value integrated by the integrating device is a local minimum value from the plurality of coordinate positions by shifting the section along the first direction over the image;
a blocking setting device setting a plurality of blocks corresponding to sequences of the first points, wherein each distance between the neighbor first points in the sequence is not in excess of a predetermined threshold value;
a setting device setting a section having a predetermined width corresponding to each of the plurality of blocks of first points extracted by the first extracting device;
a second extracting device extracting the first point as a second point where a pixel value integrated by the integrating device is a minimum value in each of the sections corresponding to the first point;
an interpolating device calculating a base value at each of the plurality of coordinate positions along the first direction over the image from an interpolation based on the pixel values integrated by the integrating device at the second points extracted by the second extracting device;
a compensating device compensating the pixel value integrated by the integrating device as a compensated value at each coordinate position along the first direction over the image based on the base value; and
a recognition device recognizing an area having the compensated value compensated by the compensating device in excess of a predetermined threshold value as a character area; and
a display device including a character string display part for displaying a character string having a plurality of characters and a character area display part surrounding each character included in the character area recognized by the recognition device.

10. The character extracting apparatus according to claim 9, wherein the predetermined width of the section set by the setting device is set to be substantially the same as a width of the character to be extracted.

11. The character extracting apparatus according to claim 9, wherein the predetermined width of the section set by the setting device is set to 110% to 120% of a width of the character to be extracted.

12. The character extracting apparatus according to claim 9, wherein the predetermined width of the section set by the setting device is set based on a predetermined height of the character string and a preset ratio of height to width of the character to be extracted.

13. The character extracting apparatus according to claim 9, wherein
the display device
includes a rectangular-shaped window; and further comprising:
a waveform display part for displaying a waveform formed by the pixel values integrated by the integrating device at each of a plurality of coordinate positions along the first direction over the image; and
the display device displaying each character displayed on the character string display part and a part of the displayed waveform on the waveform display part corresponding to each character displayed on the character string display part with a mutual positioning relationship on the display device.

14. The character extracting apparatus according to claim 9, further comprising:
an adjusting device manually adjusting the width of the section, and
a waveform display part for displaying a waveform formed by the compensated values compensated by the compensating device at each coordinate position along the first direction over the image.

15. The character extracting apparatus according to claim 9, further comprising:
an adjusting device manually adjusting the width of the section, and
a waveform display part for displaying a waveform formed by the base values interpolated by the interpolating device at each coordinate position along the first direction over the image.

16. The character extracting apparatus according to claim 9, wherein
the display device includes a rectangular-shaped window; and further comprising:
a waveform display part for displaying a waveform formed by the pixel values integrated by the integrating device at each coordinate position along the first direction over the image and the threshold value overlapping with the waveform; and
the display device displaying each character displayed on the character string display part and a part of the displayed waveform on the waveform display part corresponding to each character displayed on the character string display part with a mutual positioning relationship on the display device.

17. The character extracting apparatus according to claim 9, further comprising:
an evaluating device evaluating an extraordinary point based on the pixel values integrated by the integrating device at each of the plurality of coordinate positions along the first direction over the image and the pixel values integrated by the integrating device at neighbors of each of the plurality of coordinate positions along the first direction over the image, and
an excluding device excluding the extraordinary point evaluated by the evaluating device from points utilized by the interpolating device.

18. A method for extracting each of a plurality of characters from a character string having the plurality of characters arranged in a first direction and included in an image, comprising the steps of:
integrating a plurality of pixel values along a second direction orthogonal to the first direction at each of a plurality of coordinate positions along the first direction over the image;
setting a section having a predetermined width at each of a plurality of different positions by shifting the section along the first direction over the image;
setting a plurality of blocks corresponding to sequences of the first points, wherein each distance between the neighbor first points in the sequence is not in excess of a predetermined threshold value;
extracting a first point where a pixel value integrated by the integrating step is a minimum value in each of the sections set by the setting step;
extracting a second point where a pixel value integrated by the integrating step is a minimum value in each of the plurality of blocks of first points, extracted by the first extracting step, in sequence along the first direction;
calculating a base value at each of the plurality of coordinate positions along the first direction over the image from an interpolation based on the pixel values integrated by the integrating step at the second points extracted by the second extracting step;
subtracting the base value from the pixel value integrated by the integrating step as a compensated value at each coordinate position along the first direction over the image; and
recognizing an area having the compensated value compensated by the compensating step in excess of a predetermined threshold value as a character area.

19. A non-transitory computer readable medium including a program for extracting each of a plurality of characters from a character string having the plurality of characters arranged in a first direction and included in an image, the program including:
an integrating device for integrating a plurality of pixel values along a second direction orthogonal to the first direction at each of a plurality of coordinate positions by shifting the section along the first direction over the image;
a setting device setting a section having a predetermined width at each of a plurality of different positions along the first direction over the image;
a first extracting device extracting a first point where a pixel value integrated by the integrating device is a minimum value in each of the sections set by the setting device;
a blocking setting device setting a plurality of blocks corresponding to sequences of the first points, wherein each distance between the neighbor first points in the sequence is not in excess of a predetermined threshold value;
a second extracting device extracting a second point where a pixel value integrated by the integrating device is a minimum value in each of the plurality of blocks of first points, extracted by the first extracting device, in sequence along the first direction;
an interpolating device calculating a base value at each of the plurality of coordinate positions along the first direction over the image from an interpolation based on the pixel values integrated by the integrating device at the second points extracted by the second extracting device;
a compensating device subtracting the base value from the pixel value integrated by the integrating device as a compensated value at each of the plurality of coordinate positions along the first direction over the image; and
a recognition device recognizing an area having the compensated value compensated by the compensating device in excess of a predetermined threshold value as a character area.

* * * * *